(12) United States Patent
Hellhake et al.

(10) Patent No.: US 9,979,635 B2
(45) Date of Patent: *May 22, 2018

(54) METHOD FOR CONTROLLING FLOOD BROADCASTS IN A WIRELESS MESH NETWORK

(71) Applicant: Rajant Corporation, Malvern, PA (US)

(72) Inventors: Paul R. Hellhake, Downingtown, PA (US); Martin A. Lamb, Romansville, PA (US); Alaattin Caliskan, Downingtown, PA (US); David Acker, Malvern, PA (US); Joseph E. Parks, Coatesville, PA (US)

(73) Assignee: Rajant Corporation, Malvern, PA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/372,157

(22) Filed: Dec. 7, 2016

(65) Prior Publication Data

US 2017/0093697 A1 Mar. 30, 2017

Related U.S. Application Data

(63) Continuation of application No. 14/076,600, filed on Nov. 11, 2013, now Pat. No. 9,531,632.

(Continued)

(51) Int. Cl.
*H04L 12/721* (2013.01)
*H04L 12/801* (2013.01)
*H04L 12/26* (2006.01)
*H04L 12/733* (2013.01)
*H04L 12/803* (2013.01)
*H04W 84/18* (2009.01)

(52) U.S. Cl.
CPC .............. *H04L 45/32* (2013.01); *H04L 43/16* (2013.01); *H04L 45/20* (2013.01); *H04L 47/125* (2013.01); *H04L 47/14* (2013.01); *H04W 84/18* (2013.01)

(58) Field of Classification Search
CPC ......... H04L 45/32; H04L 45/20; H04L 43/16; H04L 47/14; H04L 47/125; H04W 84/18
USPC ........................................................ 370/235
See application file for complete search history.

(56) References Cited

U.S. PATENT DOCUMENTS

2003/0095504 A1 5/2003 Ogier
2003/0118035 A1* 6/2003 Sharma .................. H04L 45/00
370/401

(Continued)

*Primary Examiner* — Stephen J Clawson
(74) *Attorney, Agent, or Firm* — Blank Rome LLP

(57) ABSTRACT

Computer networks with multiple nodes are often required to deliver packets to all nodes in the network, commonly referred to as "flooding." Flooding is used to deliver multicast and broadcast packets generated by application, network and other layers of the networking stack. Flooding can be done very reliably but less efficiently via node to node "unicast" transmissions, or very efficiently but less reliably via "broadcast" transmissions. In order to balance reliability with efficiency, this invention defines a threshold for the number of neighboring nodes as seen by a given node prior to a flooding operation to determine whether data should be unicast or broadcast. Below that threshold, unicast is used; at or above that threshold, broadcast is used. The invention also incorporates knowledge of nodes seen in turn by neighbor nodes as part of this decision.

24 Claims, 4 Drawing Sheets

Related U.S. Application Data

(60) Provisional application No. 61/760,887, filed on Feb. 5, 2013.

(56) References Cited

U.S. PATENT DOCUMENTS

| | | |
|---|---|---|
| 2004/0015583 A1 | 1/2004 | Barrett et al. |
| 2005/0174962 A1 | 8/2005 | Gurevich |
| 2006/0154598 A1* | 7/2006 | Rudland ............... H04L 12/185 |
| | | 455/3.01 |

* cited by examiner

METHOD FOR CONTROLLING FLOOD BROADCASTS IN A WIRELESS MESH NETWORK

CROSS REFERENCE TO RELATED APPLICATION(S)

This application is a Continuation of U.S. patent application Ser. No. 14/076,600, filed Nov. 11, 2013, which claims benefit of U.S. Provisional Patent Application No. 61/760,887, filed on Feb. 5, 2013, both of which are hereby incorporated herein by reference in their entirety.

FIELD OF THE INVENTION

The present invention concerns tactical and other highly mobile communications networks. Such networks are distinguished by their ability to self-organize and heal connections as radio nodes enter and leave each others' direct communications ranges, with minimal impact to the performance of other nodes on the network.

DESCRIPTION OF RELATED ART

Flooding is a common network operation, which occurs when a single packet is sent to every other node in the network. Each node that receives that packet, and hasn't seen it previously, forwards it to every other known neighbor node except for the originator.

The forwarding of flood packets can be performed in two distinct ways—using either unicast or broadcast transmissions. Unicast is point to point, one node to another, with an acknowledgment packet sent in return. Unicast is a very reliable means of communicating, but it can be problematic in very dense networks because the number of unicast packets needed to perform a flooding operation increases quadratically with the number of nodes comprising the network. Broadcast is point to multipoint, one node to every other node within range. In a broadcast, the number of packets necessary to flood increases linearly with the number of nodes, so the flood is more efficient. However, broadcasts do not acknowledge receipt of packets, so they are considered less reliable. Summary of the invention.

It is therefore an object of the invention to manage messaging to balance reliability with network congestion.

To achieve the above and other objects, the present invention is directed to an improved method of handling messages broadcast across a digital network. In each such network, a series of microcomputer-based networking devices communicate with one another. Each of these network nodes will receive messages from other nodes and will transmit or relay messages to additional nodes.

In the preferred embodiment of the invention, the network is a dynamic mesh network, which has to effectively manage both very dense and very sparse network configurations. The density of the network at any given node is defined by the number of nodes that can be directly accessed by that node, i.e., that node's neighbors. In an active mesh network, nodes can be constantly moving or influenced by environmental and topographic factors. This can break direct links from a node to its neighbors, and introduce new direct linked neighbors, as nodes are repositioned.

The number of nodes directly linked to a given node is the "node density" for that given node. The Flooding Threshold protocol establishes a flooding algorithm that defines a threshold of node density. In the preferred embodiment, the network mesh maintains an active list of neighbor nodes for each node. The node threshold is compared to this neighbor count to determine the local density. When the count of neighbors falls below that local density, unicast packets are sent, one to each neighbor, to achieve the flood/forward. At or above that local density, broadcast is used—a single packet sent to every neighbor.

The Flooding Threshold protocol is further refined by considering the node density as seen by each neighbor node. Rather than broadcasting when the local node count is above the node threshold, each neighbor's reported node density is also compared to the node threshold. When a neighbor's density is below the threshold, unicast is used for the flood to that node. Only when both the local density and a neighbor's density are equal to or above the node threshold is a broadcast used. This broadcast is sent only once for each flood packet.

Some implementations of the invention also provide that all nodes maintain a count of neighbors and report any changes in count to their neighbors without sending excessive notifications of neighbor count changes.

BRIEF DESCRIPTION OF THE DRAWINGS

A preferred embodiment of the invention will be set forth in detail with reference to the drawings, in which.

DETAILED DESCRIPTION OF THE PREFERRED EMBODIMENT

Figure 1:
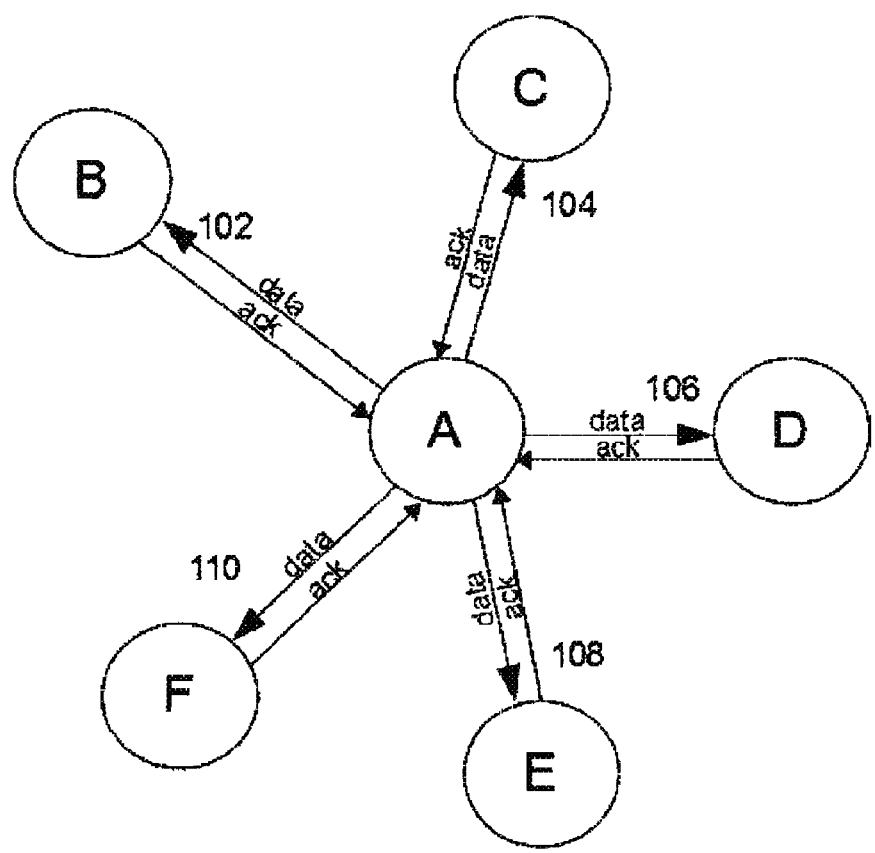
FIG. 1 illustrates Unicast Flooding.

A preferred embodiment of the present invention will be set forth in detail with reference to the drawings, in which like reference numerals refer to like elements or steps throughout.

Many messages are sent via unicast data packets. For a unicast packet, a message is constructed by one node and sent directly to the network address of the receiving node. This packet is, in turn, acknowledged by the receiving node, via an acknowledgment packet sent back to the originating node. If the originating node does not receive the acknowledgment within a defined window of time, resends the packet. Thus, this is a very reliable mechanism, as the network knows when data is not received.

However, some kinds of messages are sent to every node in a network, one packet that needs to be delivered to every node in the network, commonly referred to as "flooding." This is performed by forwarding a packet from any node to every other node that it is directly linked with (i.e., neighbor node), except to the node from which the packet was sent. The links between the nodes can be based on a variety of wired or wireless media such as Ethernet, fiber-optic, IEEE 802.11, 802.15.4, 802.16, cellular, etc. The process of forwarding continues until as many nodes as possible, and ideally all nodes comprising the network, have received a copy of the packet. In the preferred embodiment of the invention, the network is a wireless mesh network. However, the invention is applicable to other networks, particularly those with dynamically changing topologies or dense clusters of network nodes.

The forwarding of flood packets can be performed in two distinct ways—using either unicast or broadcast methods. In a unicast transmission the packet is sent to one specific node that is identified by a unique address. Unicast transmissions usually use an Automatic Repeat reQuest (ARQ) mechanism. As part of this mechanism the transmission is acknowledged, meaning the receiving node replies with a special frame, known as the Acknowledgment frame, that confirms the receipt of the transmission. In addition, successive transmission attempts (Retry frames) are made if no acknowledgment is received as the transmitting node tries to reliably deliver the packet. In unicast flooding, the forwarding node sends a unicast packet to all f its neighbors, except to the node that sent the packet.

This is illustrated in FIG. 1, Unicast Flooding 100. In this example, node A is going to deliver a packet to each of its neighbors. This happens serially; a packet is constructed and sent to node B 102, then to node C 104, then to node D 106, node E 108, and node F 110. In each case, node A will receive and process an Acknowledgment frame from each of the neighbor nodes. If one of these packets does not arrive on time, it will retry sending the packet to that neighbor again. This is inefficient as it requires the generation and transmission of replicas of the packet for each neighbor, a minimum of five packets sent and five packets received by node A. The number of replicated packets, and therefore the use of bandwidth and other related resources increases exponentially with the density of the network, where network density is defined as the average number of neighbors per node.

In a broadcast transmission, the packet is sent to all nodes that listen to a common physical medium and therefore can simultaneously receive the packet. A broadcast packet uses a special broadcast destination address, which all operating nodes following a given protocol in the network will recognize. A broadcast transmission is one time only, without the need of packet replication or acknowledgment, and is therefore more efficient in use of bandwidth and other related resources. On the other hand, due to the lack of an ARQ mechanism utilizing Acknowledgments and Retries, a broadcast transmission is not known by the sender to be received, and is inherently less reliable. There is no guarantee that a broadcast packet reaches each and every neighbor of the forwarding node. As a result, efficiency occurs at the expense of reliability as no ARQ mechanism is employed.

Figure 2:
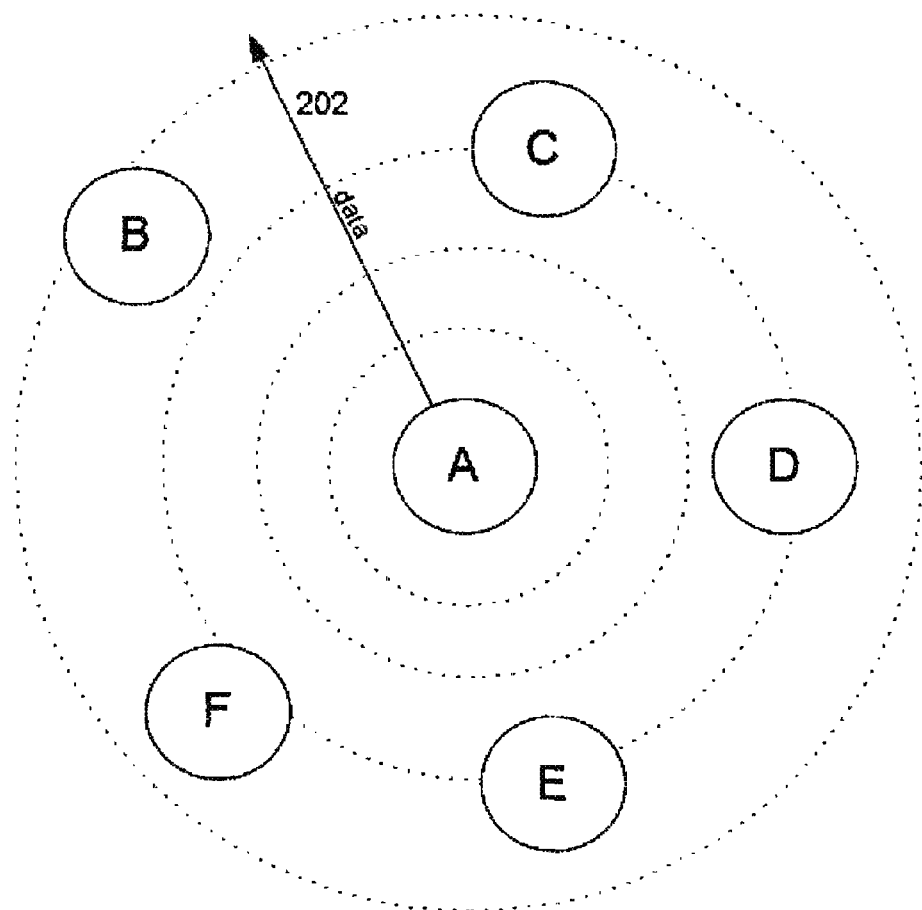
FIG. 2 illustrates Broadcast Flooding.

This is illustrated in FIG. 2, Broadcast Flooding 200. As in the previous case, node A wants to send a packet to every node it can reach. Using the broadcast flooding mechanism, it sends a single packet 202, Nodes B, C, D, E, and F should receive this packet just as before, but in the space of a single transmission, rather than ten. However, if there is some interference or other problem during the transmission, node A will not know that one or more of the neighbor nodes might have missed the packet. Reliability is diminished in exchange for efficiency.

The situation actually gets more complex in the preferred embodiment, which is running on a mesh network. During a flooding operation, each node receiving a flooded packet will forward that packet, if it has not been seen yet by the receiving node, to every node it can see other than the originator. So for the case of FIG. 1, node A will send each packet 5 times. Each of the other nodes will, in turn, send one acknowledgment packet back to node A, and then proceed to relay the packet to any of the other nodes they can see. Those nodes will not relay the packet if they have received it, but they still have to acknowledge it. If every node can see every other node, this would be 40 packets total, or in general, N*(N−1)*2 packets, quadratic growth as the network density increases.

In the broadcast flooding case, far fewer packets are required. The original node will broadcast the packet once, and each of its N−1 neighbors will forward it once, leading to a total of N packets sent, which is only linear growth. This meshing behavior lends a natural redundancy to the broadcast process. There is still no guaranteed delivery of the packet, but, for example, if node F somehow missed the initial packet from node A, it is likely to be able to get the relay either from node D or from node B. And this redundancy increases as the network density increases, which is exactly when broadcast over unicast is most efficient.

The Flooding Threshold is the number of peers that indicates the density required to use the broadcast flooding. To better assess the real network density, both sides of the link between peers must have at least the threshold number of peers to avoid using unicast flooding to that peer.

Nodes periodically report the number of peers they have to their peers and always report their peer count when they cross the threshold in either direction. Normally, the periodic reporting is only done when a link is idle during the reporting interval. When a node adds or removes peers, it must check if it has crossed the threshold and then it must immediately notify all of its peers of the new count regardless of current traffic on the link between the peers. This notification uses a unicast message to each peer. If the attempt to report the current peer count fails, the node will note this during the periodic peer reporting and send the peer report even if the link was in use during the reporting interval.

Figure 3:
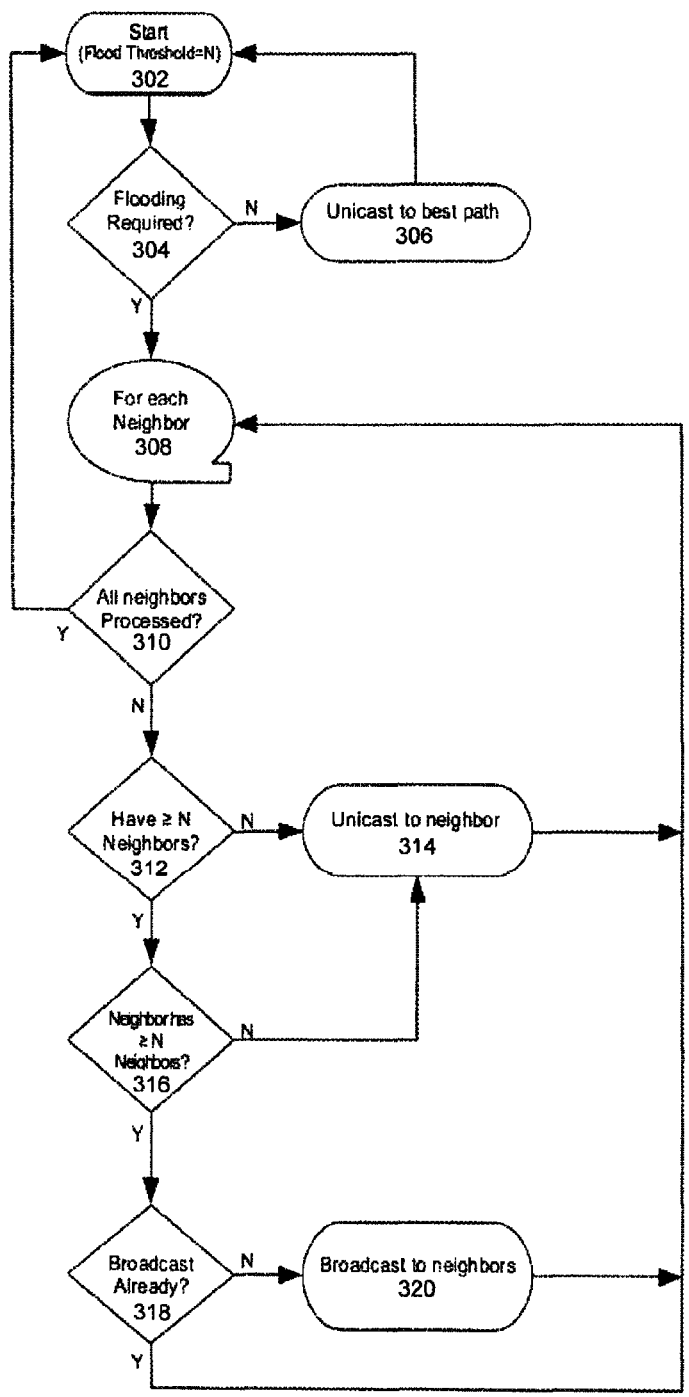
FIG. 3 illustrates the Flooding Threshold Flow Chart.

FIG. 3 illustrates the decision process 300. Start with the Flooding Threshold set to N 302. Is the operation a flooding operation 304? If not, send the packet via unicast 306, and then wait for the next packet 302. When flooding is required, consider each neighboring node independently 308. Are there more neighbors to process 310? If so, does the current node have N or more neighbors 312? if not, simply unicast to each neighbor 314. If the current node does have more than N neighbors, the processor will check the stored neighbor's neighbor count. If that is less than N 316, a unicast is still used for that neighbor 314. Otherwise, if we have not yet broadcast 318, the current node does a single broadcast to neighbors 320. The loop still continues 308, unicasting to any neighbor with less than N of its own neighbors.

Figure 4:
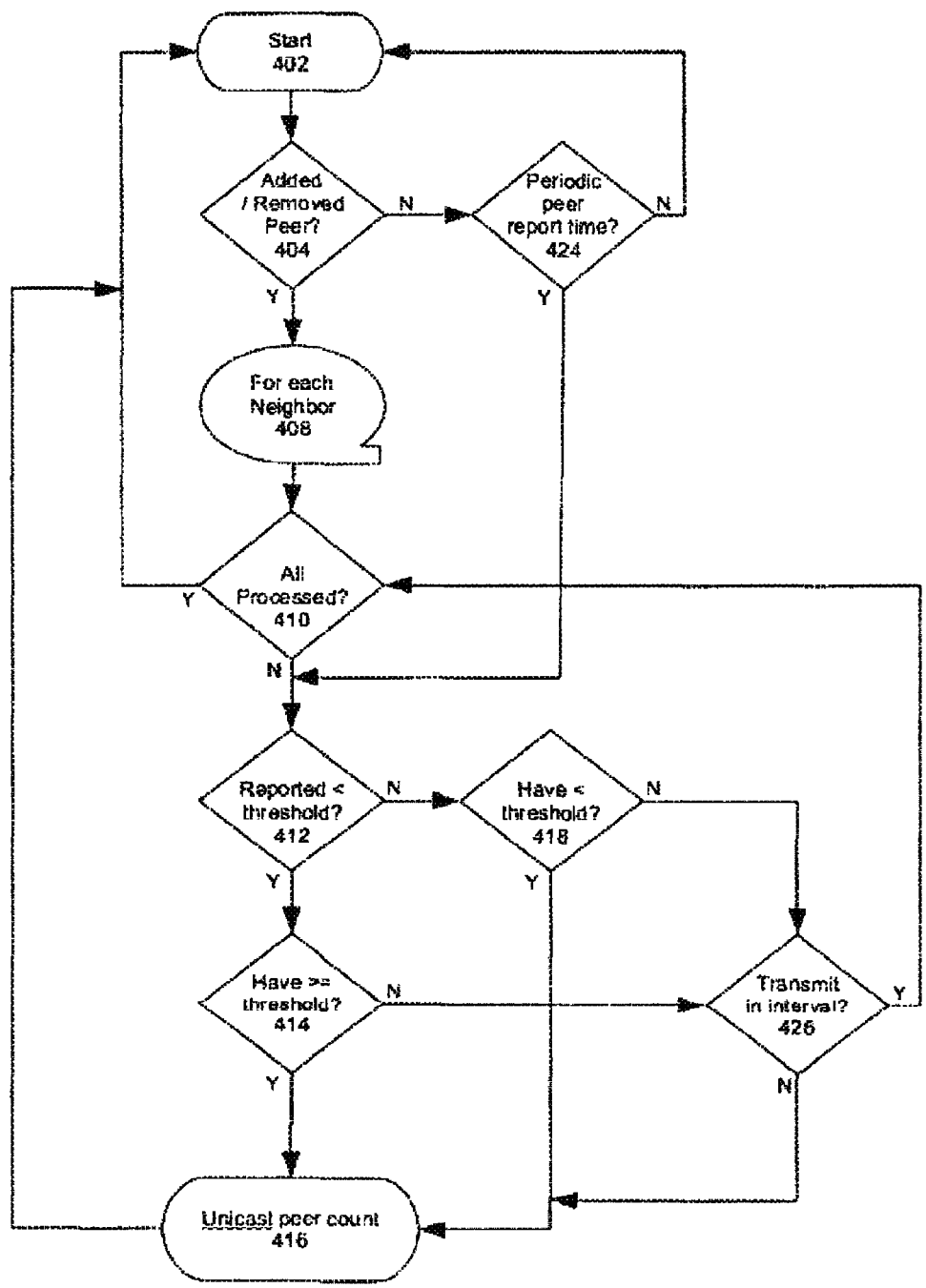
FIG. 4 illustrates the Peer Count Notification Flow Chart.

The final part of the process is neighbor count management. As nodes move around in a dynamic network, they can gain and lose neighbor nodes on a regular basis. Each node maintains a count of neighbor nodes, and when that count changes, it will send that new count of neighbors to each of its neighbor nodes. FIG. 4 illustrates the peer count notification process. Three events trigger a possible response. A peer may be (1) added or (2) removed 404 or (3) it may be time for a periodic peer count report 424. When a peer has been added or removed, the node checks its internal record of its neighbors 408 to determine if the last reported number of peers was below the threshold 414 and that the current count of peers is above the threshold 414. If both are true, it sends a unicast message to the neighbor to update the peer count 416. If it last reported greater than or equal to the threshold of peers, it then checks if it has less peers than the threshold 418. If this is true, it also sends a unicast message the neighbor to update the peer count 416. If not, it then checks if it has transmitted any messages to this peer in the last periodic interval 426. If there is no transmission, it sends a unicast message to update the peer count and test the link 416. If it has transmitted messages to this peer in the last periodic interval, it continues to check other peers if the process was triggered by adding or removing a peer 404. If the process was triggered by the periodic interval occurring 424, a unicast message is sent.

While a preferred embodiment of the present invention has been set forth above, those skilled in the art who have reviewed the present disclosure will readily appreciate that other embodiments can be realized within the scope of the invention. For example, recitations of specific technologies are illustrative rather than limiting. Therefore, the present invention should be construed as limited only by the appended claims.

What is claimed is:

1. A method for packet flooding over a computer network comprising two or more network node devices, each of the network node devices comprising at least one transceiver device and a processor that implements a data communications protocol to communicate data to other ones of the network node devices, wherein the data sent is divided into data packets, the method comprising:
    (a) maintaining, in each of the network node devices, a system-wide global flooding threshold setting;
    (b) maintaining, in each of the network node devices, a count of neighbor network node devices;
    (c) for a received packet that specifies flooding, comparing the threshold setting maintained in step (a) to a number of neighbor network node devices of each neighbor network node device;
    (d) if it is determined in step (c) that the count is below the threshold setting, using a unicast transmission to forward the received packet to each of the neighbor network node devices in turn; and
    (e) if it is determined in step (c) that the count is at or above the threshold setting, forwarding the received packet to each of the neighbor network nodes, wherein step (e) comprises using a broadcast.

2. A method as in claim 1, wherein step (e) comprises using the broadcast to forward the received packet to all of the neighbor network node devices at once.

3. A method as in claim 1, wherein each of the network node devices performs step (b) by maintaining a count of its neighbor network node devices and reports any changes to each of its neighbor network node devices on an as-needed basis, tracking what has already been reported to each of the neighbor network node devices in order to minimize a number of reports necessary to send to each of the neighbor network node devices.

4. A method as in claim 1, wherein the network comprises a wireless mesh network.

5. A method as in claim 1, wherein step (c) further comprises: for the received packet that specifies flooding, comparing the threshold setting maintained in step (a) also to the count of neighbor network node devices maintained in step (b).

6. A method for packet flooding over a computer network comprising two or more network node devices, each of the network node devices comprising at least one transceiver device and a processor that implements a data communications protocol to communicate data to other ones of the network node devices, wherein the data sent is divided into data packets, the method comprising:
    (a) maintaining, in each of the network node devices, a system-wide global flooding threshold setting;
    (b) maintaining, in each of the network node devices, a count of neighbor network node devices;
    (c) for a received packet that specifies flooding, comparing the threshold setting maintained in step (a) to the count of neighbor network node devices maintained in step (b);
    (d) if it is determined in step (c) that the count is below the threshold setting, using a unicast transmission to forward the received packet to each of the neighbor network node devices in turn; and
    (e) if it is determined in step (c) that the count is at or above the threshold setting, forwarding the received packet to each of the neighbor network nodes, wherein step (e) comprises using a broadcast;
    wherein, for a local count at or above the defined threshold setting, step (e) comprises:
        (i) comparing the neighbor count of each neighbor network node device to the threshold setting;
        (ii) if the neighbor count of the neighbor network node device is below the threshold setting, using a unicast transmission to forward the flood packet to that neighbor network node device; and
        (iii) if the neighbor count of the neighbor network node device is at or above the threshold setting, using a broadcast transmission to forward the flood packet to all neighbor network node devices at once.

7. A method as in claim 6, wherein step (e) comprises using the broadcast to forward the received packet to all of the neighbor network node devices at once.

8. A method as in claim 6, wherein each of the network node devices performs step (b) by maintaining a count of its neighbor network node devices and reports any changes to each of its neighbor network node devices on an as-needed basis, tracking what has already been reported to each of the neighbor network node devices in order to minimize a number of reports necessary to send to each of the neighbor network node devices.

9. A method as in claim 6, wherein the network comprises a wireless mesh network.

10. A method as in claim 6, wherein step (c) further comprises: for the received packet that specifies flooding, comparing the threshold setting maintained in step (a) also to a number of neighbor network node devices of each neighbor network node device.

11. A system for packet flooding over a computer network comprising two or more network node devices, the network node devices comprising:
    at least one transceiver device; and
    a processor that implements a data communications protocol to communicate data to other ones of the network node devices, wherein the data sent is divided into data packets, the processor configured for:
    (a) maintaining, in each of the network node devices, a system-wide global flooding threshold setting;
    (b) maintaining, in each of the network node devices, a count of neighbor network node devices;
    (c) for a received packet that specifies flooding, comparing the threshold setting maintained in step (a) to a number of neighbor network node devices of each neighbor network node device;
    (d) if it is determined in step (c) that the count is below the threshold setting, using a unicast transmission to forward the received packet to each of the neighbor network node devices in turn; and
    (e) if it is determined in step (c) that the count is at or above the threshold setting, forwarding the received packet to each of the neighbor network nodes, wherein step (e) comprises using a broadcast.

12. A system as in claim 11, wherein the processor is configured to perform step (e) by using the broadcast to forward the received packet to all of the neighbor network node devices at once.

13. A system as in claim 11, wherein the processor in each of the network node devices is configured to perform step (b) by maintaining a count of its neighbor network node devices and reports any changes to each of its neighbor network node devices on an as-needed basis, tracking what has already been reported to each of the neighbor network node devices in order to minimize a number of reports necessary to send to each of the neighbor network node devices.

14. A system as in claim 11, wherein the at least one transceiver device comprises a transceiver device for a wireless mesh network.

15. A system as in claim 11, wherein step (c) further comprises: for the received packet that specifies flooding, comparing the threshold setting maintained in step (a) also to the count of neighbor network node devices maintained in step (b).

16. A system for packet flooding over a computer network comprising two or more network node devices, the network node devices comprising:
   at least one transceiver device; and
   a processor that implements a data communications protocol to communicate data to other ones of the network node devices, wherein the data sent is divided into data packets, the processor configured for:
   (a) maintaining, in each of the network node devices, a system-wide global flooding threshold setting;
   (b) maintaining, in each of the network node devices, a count of neighbor network node devices;
   (c) for a received packet that specifies flooding, comparing the threshold setting maintained in step (a) to the count of neighbor network node devices maintained in step (b);
   (d) if it is determined in step (c) that the count is below the threshold setting, using a unicast transmission to forward the received packet to each of the neighbor network node devices in turn; and
   (e) if it is determined in step (c) that the count is at or above the threshold setting, forwarding the received packet to each of the neighbor network nodes, wherein step (e) comprises using a broadcast;
   wherein, for a local count at or above the defined threshold setting, the processor is configured to perform step (e) by:
   (i) comparing the neighbor count of each neighbor network node device to the threshold setting;
   (ii) if the neighbor count of the neighbor network node device is below the threshold setting, using a unicast transmission to forward the flood packet to that neighbor network node device; and
   (iii) if the neighbor count of the neighbor network node device is at or above the threshold setting, using a broadcast transmission to forward the flood packet to all neighbor network node devices at once.

17. A system as in claim 16, wherein the processor is configured to perform step (e) by using the broadcast to forward the received packet to all of the neighbor network node devices at once.

18. A system as in claim 16, wherein the processor in each of the network node devices is configured to perform step (b) by maintaining a count of its neighbor network node devices and reports any changes to each of its neighbor network node devices on an as-needed basis, tracking what has already been reported to each of the neighbor network node devices in order to minimize a number of reports necessary to send to each of the neighbor network node devices.

19. A system as in claim 16, wherein the at least one transceiver device comprises a transceiver device for a wireless mesh network.

20. A system as in claim 16, wherein step (c) further comprises: for the received packet that specifies flooding, comparing the threshold setting maintained in step (a) also to a number of neighbor network node devices of each neighbor network node device.

21. A system for ensuring reliable and efficient packet flooding over a computer network comprising two or more network node devices, the network node devices comprising:
   at least one transceiver device; and
   a processor that implements a data communications protocol to communicate data to other ones of the network node devices, wherein the data sent is divided into data packets, with each of the data packets being encoded with a protocol header that includes that packet's source address, destination address, transmitter address, receiver address, cost information, and data flags that indicate the type and other attributes of any given packet, the processor configured for:
   (a) maintaining, in each of the network node devices, a system-wide global flooding threshold setting;
   (b) maintaining, in each of the network node devices, a count of neighbor network node devices;
   (c) for a received packet that specifies flooding, comparing the threshold setting maintained in step (a) to the count of neighbor network node devices maintained in step (b);
   (d) if it is determined in step (c) that the count is below the threshold setting, using a unicast transmission to forward the received packet to each of the neighbor network node devices in turn; and
   (e) if it is determined in step (c) that the count is at or above the threshold setting, forwarding the received packet to each of the neighbor network nodes, wherein step (e) comprises using a broadcast;
   wherein, for a local count at or above the defined threshold setting, the processor is configured to perform step (e) by:
   (i) comparing the neighbor count of each neighbor network node device to the threshold setting;
   (ii) if the neighbor count of the neighbor network node device is below the threshold setting, using a unicast transmission to forward the flood packet to that neighbor network node device; and
   (iii) if the neighbor count of the neighbor network node device is at or above the threshold setting, using a broadcast transmission to forward the flood packet to all neighbor network node devices at once.

22. A system as in claim 21, wherein the processor is configured to perform step (e) by using the broadcast to forward the received packet to all of the neighbor network node devices at once.

23. A system as in claim 21, wherein the processor in each of the network node devices is configured to perform step (b) by maintaining a count of its neighbor network node devices and reports any changes to each of its neighbor network node devices on an as-needed basis, tracking what has already been reported to each of the neighbor network node devices in order to minimize a number of reports necessary to send to each of the neighbor network node devices.

24. A system as in claim 21, wherein the at least one transceiver device comprises a transceiver device for a wireless mesh network.

* * * * *